US012585964B2

(12) United States Patent
Li

(10) Patent No.: US 12,585,964 B2
(45) Date of Patent: Mar. 24, 2026

(54) EXHAUSTIVE LEARNING TECHNIQUES FOR MACHINE LEARNING ALGORITHMS

(71) Applicant: PayPal, Inc., San Jose, CA (US)

(72) Inventor: Zeding Li, Shanghai (CN)

(73) Assignee: PayPal, Inc., San Jose, CA (US)

( * ) Notice: Subject to any disclaimer, the term of this patent is extended or adjusted under 35 U.S.C. 154(b) by 979 days.

(21) Appl. No.: 17/455,252

(22) Filed: Nov. 17, 2021

(65) Prior Publication Data

US 2023/0072199 A1      Mar. 9, 2023

(51) Int. Cl.
*G06N 5/01* (2023.01)
*G06N 5/022* (2023.01)
*G06N 20/00* (2019.01)

(52) U.S. Cl.
CPC .............. *G06N 5/022* (2013.01); *G06N 5/01* (2023.01)

(58) Field of Classification Search
CPC .................................. G06N 5/022; G06N 5/01
See application file for complete search history.

(56) References Cited

U.S. PATENT DOCUMENTS

2009/0018985 A1* 1/2009 Zhang .................. G06V 40/165
706/20
2015/0379426 A1    12/2015 Steele et al.

FOREIGN PATENT DOCUMENTS

CN        105956382 A      9/2016
CN        106067039 A      11/2016

CN        108829457 A      11/2018
CN        109885916 A      6/2019
CN        113240013 A      8/2021

OTHER PUBLICATIONS

Gelfand, Saul et al.; "An Iterative Growing and Pruning Algorithm for Classification Tree Design"; 1989; Conference Proceedings., IEEE International Conference on Systems, Man and Cybernetics; 818-823 (Year: 1989).*
Cohen, William et al.; "Fast Effective Rule Induction"; 1995; Proceedings of the Twelfth International Conference on Machine Learning; 115-123 (Year: 1995).*

(Continued)

*Primary Examiner* — David Yi
*Assistant Examiner* — Ezra J Baker
(74) *Attorney, Agent, or Firm* — Kowert, Hood, Munyon, Rankin & Goetzel, P.C.

(57) ABSTRACT

Techniques are disclosed relating to exhaustive learning techniques for machine learning algorithms. In various embodiments, the disclosed techniques include performing an iterative machine learning operation that includes training a first version of a machine learning model (e.g., a decision tree model) based on a current version of a training dataset, where the first version of the machine learning model includes a plurality of decision branches, identifying a first subset of data samples that satisfy evaluation criteria included in a first one of the plurality of decision branches, and removing this first subset of data samples to generate an updated version of the training dataset. In various embodiments, the disclosed techniques include repeating the iterative machine learning operation using the updated version of the training dataset to produce a final trained version of the machine learning model.

20 Claims, 9 Drawing Sheets

(56) References Cited

OTHER PUBLICATIONS

Kors, J.A. et al.; "Induction of decision rules that fulfil user-specified performance requirements"; 1997; Elsevier, Pattern Recognition Letters 18 (1997); 1187-1195 (Year: 1997).*

Kearns, Michael et al.; "A Fast, Bottom-Up Decision Tree Pruning Algorithm with Near-Optimal Generalization"; 1998; 1-16 (Year: 1998).*

Lawrence, Rick and Wright, Andrea; "Rule-Based Classification Systems Using Classification and Regression Tree (CART) Analysis"; 2001; Photogrammetric Engineering And Remote Sensing vol. 67 No. 10; 1137-1142 (Year: 2001).*

Chan, Allen et al.; "A New Classification-Rule Pruning Procedure for an Ant Colony Algorithm"; 2006; 25-36; Lecture Notes in Computer Science ((LNTCS,vol. 3871)); 25-36 (Year: 2006).*

Liu, Sheng et al.; "Combined Rule Extraction and Feature Elimination in Supervised Classification"; Sep. 2012; IEEE Transactions on Nanobioscience, vol. 11 No 3; 228-236 (Year: 2012).*

De Ville, Barry; "Decision trees"; 2013; WIREs Comput Stat 2013, 5; 448-455 (Year: 2013).*

Li, Jing et al.; "Hard Drive Failure Prediction Using Classification and Regression Trees"; 2014; 2014 44th Annual IEEE/IFIP International Conference on Dependable Systems and Networks; 383-394 (Year: 2014).*

Xie, Hongtao et al.; "The Study of Methods for Post-pruning Decision Trees Based on Comprehensive Evaluation Standard"; 2014; 2014 11th International Conference on Fuzzy Systems and Knowledge Discovery; 903-908 (Year: 2014).*

Wang, Zichuan et al.; "A multi-objective evolutionary algorithm for feature selection based on mutual information with a new redundancy measure"; 2015; Information Sciences 307 (2015); 73-88 (Year: 2015).*

Han, Rui et al.; "SlimML: Removing Non-Critical Input Data in Large-Scale Iterative Machine Learning"; Apr. 2021; IEEE Transactions on Knowledge and Data Engineering vol. 33 No 5; 2223-2236 (Year: 2021).*

Jiang, Xiangkui et al.; "Forest Pruning Based on Branch Importance"; Jun. 2017; Hindawi Computational Intelligence and Neuroscience vol. 2017; 1-11 (Year: 2017).*

International Search Report and Written Opinion in PCT Appl. No. PCT/CN2021/116487 mailed Jun. 1, 2022, 10 pages.

Schwartz et al., "Exhaustive Learning," Neural Computation 2, 374-385 (1990).

Kearns et al., "A Fast, Bottom-Up Decision Tree Pruning Algorithm with Near-Optimal Generalization," In Proceedings of the 15th International Conference on Machine Learning, Feb. 27, 1998, 16 pages.

Mikkel Duif, "An Introduction to Decision Trees with Python and scikit-learn," Towards Data Science, Jan. 1, 2020; https://towardsdatascience.com/an-introduction-to-decision-trees-with-python-and-scikit-learn-1a5ba6fc2045; 9 pages. [Retrieved Aug. 12, 2021].

Lars Hulstaert, "Black-box vs. white-box models," Towards Data Science, Mar. 14, 2019; https://towardsdatascience.com/machine-learning-interpretability-techniuqes-662c723454f3, 7 pages. [Retrieved Jul. 16, 2021].

"Decision tree pruning," Wikipedia; https://en.wikipedia.org/w/index.php?title=Decision_tree_pruning&oldid=1018852099; page was last edited on Apr. 20, 2021, 3 pages.

Pandula Weerasooriya, "Implementing a classification tree with Gini Impurity from scratch in Python," Dec. 27, 2019; https://pandulaofficial.medium.com/implementing-cart-algorithm-from-scratch-in-python-5dd00e9d36e; 10 pages.

Z2 Little, "Post-pruning techniques in decision tree," Feb. 16, 2020; https://xzz201920.medium.com/post-pruning-techniques-in-decision-tree-4be56636172b; 5 pages.

Jason Brownlee, "How to Calculate Feature Importance With Python," Mar. 30, 2020; https://machinelearningmastery.com/calculate-feature-importance-with-python/; 26 pages. [Retrieved Jul. 23, 2021].

* cited by examiner

*Translate to Logical Representation of Decision Branch 152A*

Decision Branch 152A = MODEL1_SCORE <= 0.75 AND MODEL2_SCORE <= 100 AND
anomaly_classifier = 'NO_ANOMALY' AND riskiness_classification ≠ 'RISKY' AND
country = 'US'

<u>300</u>

Data Samples <u>122A-122J</u>

Training Dataset
<u>120</u>

- ● Class 1 Samples
- ○ Class 2 Samples
- ⊗ Samples Covered By Decision Rule 130

Perform Training Operation

Remaining Data Samples <u>122A-122F</u>
(Excluding Data Samples <u>122G-122J</u>
Covered By Rule <u>130A</u>)

Data Samples <u>122G-122J</u>
Covered by Rule <u>130A</u>

Updated Training
Dataset <u>140A</u>

+

Repeat Training Operation with
Updated Training Dataset <u>140A</u>

Remaining Data Samples <u>122A-122C</u>
(Excluding Data Samples <u>122D-122F</u>
Covered by Rule <u>130B</u>)

Data Samples <u>122D-122F</u>
Covered by Rule <u>130B</u>

Updated Training
Dataset <u>140B</u>

+

Repeat Training Operation with
Updated Training Dataset <u>140B</u>

Data Samples 122

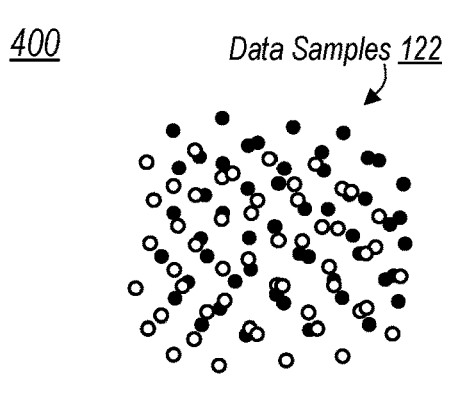

Training Dataset 120

Features 124 Ranked by Feature-Importance

Feature 124A
Feature 124B
Feature 124C
...
Feature 124N

Remaining Data Samples 122

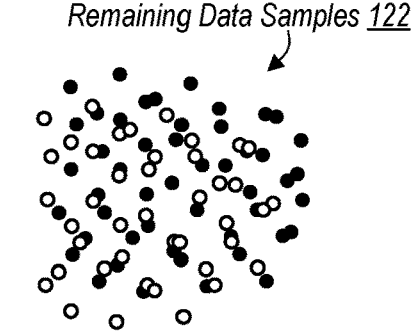

Updated Training Dataset 140C

Remaining Features 124 Ranked by Feature-Importance

Feature 124B
Feature 124C
Feature 124D
...
Feature 124N

Remaining Data Samples 122

Updated Training Dataset 140D

Remaining Features 124 Ranked by Feature-Importance

Feature 124C
Feature 124D
Feature 124E
...
Feature 124N

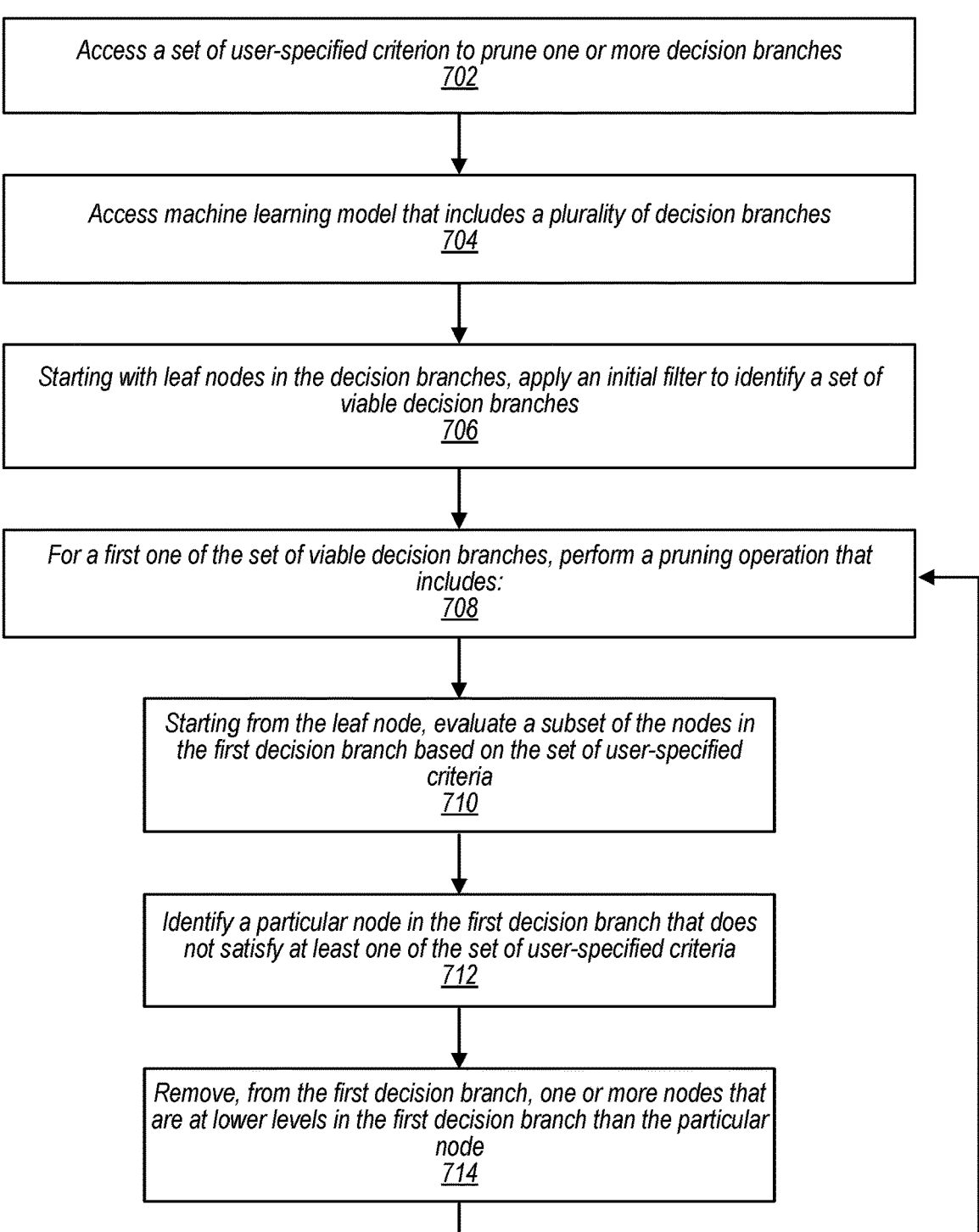

Access a set of user-specified criterion to prune one or more decision branches
702

Access machine learning model that includes a plurality of decision branches
704

Starting with leaf nodes in the decision branches, apply an initial filter to identify a set of viable decision branches
706

For a first one of the set of viable decision branches, perform a pruning operation that includes:
708

Starting from the leaf node, evaluate a subset of the nodes in the first decision branch based on the set of user-specified criteria
710

Identify a particular node in the first decision branch that does not satisfy at least one of the set of user-specified criteria
712

Remove, from the first decision branch, one or more nodes that are at lower levels in the first decision branch than the particular node
714

*FIG. 7*

EXHAUSTIVE LEARNING TECHNIQUES FOR MACHINE LEARNING ALGORITHMS

PRIORITY CLAIM

The present application claims priority to PCT Appl. No. PCT/CN2021/116487, filed Sep. 3, 2021, which is incorporated by reference herein in its entirety.

BACKGROUND

Technical Field

This disclosure relates generally to data science and machine learning, and more particularly to exhaustive learning techniques for machine learning algorithms.

Description of the Related Art

Server computer systems, such as web servers, application servers, email servers, etc., may provide various computing resources and services to an end user. For example, a web service may use a computer system to provide access to software applications to remote users via a network. A server system may utilize various techniques to determine whether to authorize a request it receives. For example, a server system may utilize one or more machine learning models to evaluate various attributes (e.g., IP address) of a request and predict whether the request is likely to be malicious. In some instances, for example, a server system will use an artificial neural network (e.g., a deep learning model) to evaluate and determine whether to authorize requests. One technical problem with this approach, however, is that many machine learning algorithms, such as artificial neural networks, gradient-boosted decision trees, etc., are "black-box" algorithms that are viewed in terms of their inputs and outputs with little knowledge about their inner workings, such that the server system using a black-box algorithm may be unable to definitely identify the reason(s) for which a given request was authorized or denied.

BRIEF DESCRIPTION OF THE DRAWINGS

FIG. 3 is a block diagram illustrating an example representation of a training dataset and an updated training dataset during various iterations of the disclosed exhaustive learning techniques, according to some embodiments.

FIGS. 4A-4C are block diagrams illustrating an example representation of a training dataset and updated training datasets, according to some embodiments.

FIG. 7 is a flow diagram illustrating an example method for pruning one or more nodes from a decision branch based on a set of one or more user-specified criteria, according to some embodiments.

DETAILED DESCRIPTION

Figure 1:
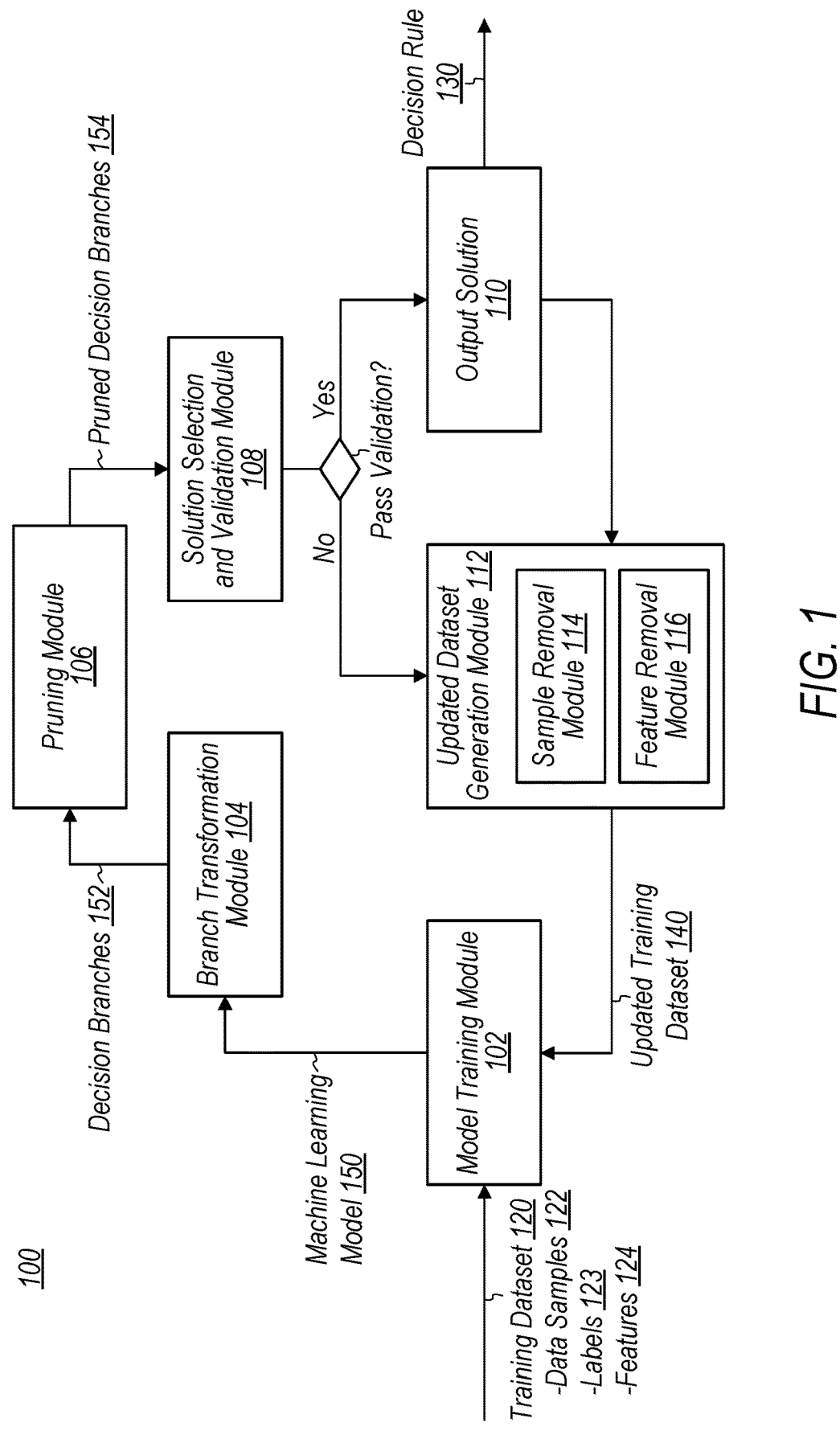
FIG. 1 is a block diagram illustrating an example system that utilizes an exhaustive learning technique to train one or more versions of a machine learning model using a white box machine learning algorithm and, based on these models, generate one or more decision rules, according to some embodiments.

A server system may utilize various techniques to determine whether to authorize the requests it receives. One such technique includes using one or more machine learning models to evaluate various features (also referred to as "attributes") of a request and to predict whether the request is malicious. For example, to determine whether to authorize a request, a server system may use an artificial neural network ("ANN") to predict the probability that a request is malicious. That probability value (also referred to herein as a "model score") may then be compared to a threshold value to determine whether to authorize the request. For example, if the model score does not exceed a certain threshold value, the server system may process the request. If, however, that model score does exceed that threshold value, the server system may determine that the request is likely to be malicious and may initiate one or more protective actions (e.g., requiring multi-factor authentication, denying the request, etc.).

One technical problem with this approach is that many machine learning algorithms, such as ANNs (including deep learning ANNs), gradient-boosted decision trees, etc., are "black-box" algorithms that are viewed in terms of their inputs and outputs with little to no knowledge about their inner workings. So, while many black-box machine learning algorithms may perform well (e.g., as measured by accuracy, catch rate, etc.), in practice the logic behind these black-box algorithms is often too complex to interpret. This lack of interpretability presents a technical problem, as the particular real-world factors leading to a decision by the machine learning model cannot be identified.

Due to the poor interpretability of black-box machine learning algorithms, many server systems perform these authorization decisions, in whole or in part, using decision rules that are either manually generated based on analyst expertise or automatically generated using "white-box" machine learning algorithms. Both of these techniques present various shortcomings, however. For example, manually constructing decision rules is both time-consuming and expensive, and manually constructed rules may quickly become outdated as malicious users modify the manner in which they perform their attacks. Generating decision rules using white-box machine learning algorithms addresses these problems, but decision rules generated in this manner often perform worse than their black-box machine learning algorithm counterparts. As will be appreciated by one of skill in the art with the benefit of this disclosure, a "white-box" machine learning algorithm is one for which the structure and details of the algorithm are available to, and more readily interpretable by, a user (e.g., an analyst or data scientist working on a decision management system in the server system). Non-limiting examples of white-box algorithms include single decision tree machine learning algorithms (e.g., CART, ID3, C4.5, etc.) and linear regression algorithms (e.g., logistic, probit, etc.). In many instances, a server system will train a machine learning model using a white-box machine learning algorithm based on a training dataset that includes data samples corresponding to previous requests and labels indicating whether the corresponding requests were classified as malicious. This machine learning model may then be broken down into one or more decision rules that may be used (e.g., by the server system's decision management system) to determine whether to authorize the requests it receives.

As will be appreciated by one of skill in the art, using prior techniques there is typically a trade-off in machine learning algorithms between interpretability and performance such that algorithms that are easier to interpret often perform worse than models that are more difficult to interpret. Thus, using prior machine learning techniques, users are often forced to choose between a black-box machine learning algorithm that offers better performance but is difficult (or impossible) for a human to interpret, or a white-box machine learning algorithm that is significantly easier to interpret but typically provides worse performance.

In various embodiments, however, the disclosed techniques provide a technical solution to these technical problems using exhaustive learning techniques for machine learning algorithms that improve the number and quality of decision rules that are generated, from a given training dataset, using a white-box machine learning algorithm. As described in more detail below, in some embodiments the disclosed techniques include using a white-box machine learning model to generate one or more decision rules. If those decision rules satisfy various user-specified performance criteria, the disclose techniques include removing, from the training dataset, those data samples from the training dataset that are "covered by" (e.g., satisfy the evaluation criteria in) those decision rules. In various embodiments, the disclosed techniques then include training a new machine learning model based on those remaining training data samples and using this new machine learning model to generate one or more additional decision rules. In various embodiments, utilizing the remaining data samples in the training dataset (that is, the data samples that were not covered by the previously generated decision rules) to generate additional decision rules may provide various technical benefits. For example, these remaining data samples may still contain informative or predictive value such that the decision rules generated based on these remaining data samples capture this predictive value while improving the coverage of the decision rules generated from the training dataset. In various embodiments, this process may be repeated until a machine learning model is generated, from the residual training dataset, which no longer includes decision rules that satisfy the user-specified performance criteria. In this way, various disclosed embodiments may be said to "exhaust" the predictive power in a dataset by using that dataset to perform recursive training in a way that, in various embodiments, improves the performance and accuracy of white-box machine learning algorithms.

At this point, various disclosed embodiments include removing one or more of the features from the training dataset, training a new machine learning model based on this new version of the training dataset, and using this new version of the machine learning model to identify one or more decision rules. In some embodiments, the disclosed techniques include removing, from the training dataset, the feature(s) having the highest feature-importance measure. In various embodiments, removing features from the training dataset may provide various technical benefits. For example, by removing one or more of the features, particularly the most important feature(s), from the training dataset, the new version of the machine learning model that is trained based on the new version of the training dataset will likely have a significantly different structure than the previous version of the model. This, in turn, may allow the disclosed techniques to generate new and interesting decision rules, from the training dataset, that may not have been discovered using prior machine learning techniques.

Accordingly, various disclosed embodiments improve the ability to generate decision rules, using machine learning algorithms, that are interpretable, satisfy user-specified performance criteria, and cover larger portions of the training dataset than prior techniques. This, in turn, may improve the performance of the server system in determining whether to authorize the various requests it receives and, as a result, the operation of the server system as a whole.

FIG. 1 depicts a block diagram of a system 100 that utilizes an exhaustive learning technique to train one or more versions of a machine learning model using a white box machine learning algorithm and, based on these models, generate decision rules 130. In FIG. 1, system 100 includes a model training module 102, which, in various embodiments, is operable to train one or more machine learning models 150 based on training dataset 120. As indicated in FIG. 1, training dataset 120 includes data samples 122, each of which includes data values for one or more features 124. As will be appreciated by one of skill in the art with the benefit of this disclosure, in various embodiments the data samples 122 may correspond to individual observations of a particular type of event. In some embodiments, a given data sample 122 may be specified as a feature vector that includes a set of data values for one or more of the features 124 of the corresponding observation. Consider, as one non-limiting example, an instance in which training dataset 120 includes spam email data and includes data samples 122 that correspond to prior emails that have been classified as either "spam" or "not spam." In this non-limiting example, the data samples 122 may include data values for various features 124 of those emails, such as the IP address of the sending computer system, a time at which the email was sent, the country from which the email was sent, the presence of one or more keywords within the body of the email, whether the email includes any hyperlinks, etc.

In the depicted embodiment, the training dataset 120 also includes labels 123 for the data samples 122. In various embodiments, labels 123 are values used to indicate a particular class or category into which the corresponding data samples 122 have been assigned. That is, in some embodiments, a label 123A may be used to indicate one of multiple classes into which a corresponding data sample 122A has been classified. Continuing with the non-limiting example above in which the training dataset 120 includes spam email data and the data samples 122 correspond to individual emails that have been identified as either being "spam" or "not spam." In such an embodiment, the labels 123 may include data values used to indicate the category into which each data sample 122 has been classified. For example, labels 123, in this non-limiting example, may use a value of 0 to indicate that a given data sample 112 has been classified as "not spam" and a value of 1 to indicate that a given data sample 112 has been classified as "spam." Note, however, that these examples are not intended to limit the scope of the present disclosure and, in various embodiments, the training dataset 120 may be one used to train a regression model used to perform regression tasks (e.g., predicting the fuel efficiency of a vehicle provided an input feature vector specifying various features of the vehicle). In some such embodiments, instead of indicating one of a set of classes into which a given data sample 122 was classified, the labels 123 may include a numerical value. Continuing with the current non-limiting example, the labels 123 may specify the fuel efficiency of the vehicles represented by the data samples 122. Again, note that these embodiments are described merely as non-limiting examples and are not intended to limit the scope of the present disclosure.

In various embodiments, the machine learning model 150 is a white-box machine learning model, such as a single decision tree or a linear regression model. In instances in which the machine learning model 150 is a decision tree, for example, the model training module 102 may train the machine learning model 150 using any of various suitable decision tree learning algorithms, such as CART, ID3, C4.5, or any other suitable decision tree learning algorithm. In instances in which the machine learning model 150 is a linear regression model, as another non-limiting example, the model training module may use any of various suitable regression algorithms, such as logistic, probit, etc.

System 100 further includes branch transformation module 104, which, in various embodiments, is operable to transform the machine learning model 150 into a set of one or more decision branches 152. For example, as described in more detail below with reference to FIG. 2, machine learning model 150 may specify various different decision branches 152. In embodiments in which the machine learning model 150 is a decision tree, for example, a decision branch 152 may correspond to a path through the decision tree from the root node to a particular terminal node. In various embodiments, the nodes in the decision tree correspond to an evaluation that is performed based on the features 124 of the data samples 122. For example, in some embodiments each node in a decision tree represents a "test" on a particular feature 124 of the data samples 122, as discussed in more detail below with reference to FIG. 2. In various embodiments, different paths are taken through the decision tree for the data samples 122 based on the values for the features 124 in those data samples 122. In some embodiments, for example, branch transformation module 104 is operable to transform the machine learning model 150 into a set of one or more decision branches 152 through an iterative process in which, starting from the root node, the branch transformation module 104 iterates from the root node down to the leaf nodes and recursively finds the child nodes with features (e.g., "MODEL1_SCORE") and a threshold (e.g., 0.75) and, when it reaches a leaf node, the branch transformation module 104 returns the full branch path as a decision branch 152.

As will be appreciated by one of skill in the art with the benefit of this disclosure, in various embodiments the decision branches 152 may specify the decision logic that may be used, in whole or in part, in one or more decision rules 130. For example, a particular decision branch 152A may include a set of nodes that represent a series of tests performed on a data sample 122, where each of the nodes includes an evaluation criterion and one or more corresponding threshold values used to determine the outcome of the test performed at that node. In some such embodiments, the logic for this series of tests from the decision branch 152A may be used as the decision logic in a corresponding decision rule 130A. Note that, in various embodiments, a machine learning model 150 may include any number of decision branches 152, each of which may have any suitable number of nodes (e.g., as determined during the training process). Further note that, in various embodiments, the number of decision branches 152, and the number of nodes included therein, in a given machine learning model 150 may vary between iterations of the disclosed exhaustive learning techniques.

System 100 further includes pruning module 106, which, in various embodiments, is operable to prune one or more nodes from various decision branches 152 to generate pruned decision branches 154. The operation of pruning module 106, according to various embodiments, is described in detail below with reference to FIGS. 5A-5B and 7. For the purposes of the present discussion, however, note that in various embodiments the pruning module 106 may "prune" (that is, reduce the size of) one or more of the decision branches 152 based on a set of user-specified criteria so as to reduce the size and complexity of the decision logic specified by the pruned decision branches 154 in a manner that is interpretable and that, unlike prior techniques, takes into consideration user-specified objectives that can be adjusted based on real-world needs, rather than simply based on error reduction. The particular criteria specified by a user will vary depending on the context for which the ultimate decision rules 130 are being used. Non-limiting examples of user-specified criteria include a maximum false-positive rate ("FPR"), minimum net-to-gross loss ratio for loss-reduction solutions, minimum users or accounts impacted, etc.

System 100 further includes solution selection and validation module 108, which, in various embodiments, is operable to evaluate the various pruned decision branches 154 and, based on a set of user-specified criteria, determine whether any of the various pruned decision branches 154 pass the validation process and may be output as decision rules 130. For example, in various embodiments, if a pruned decision branch 154 passes the validation process based on the set of user-specified criteria, that pruned decision branch 154 may be output as a decision rule 130, which may be used (e.g., by a decision management service) by a server system to determine whether to authorize a given request. Note that the set of user-specified criteria used, by solution selection and validation module 108, may be the same as, overlap with, or different from the set of user-specified criteria used by pruning module 106 to prune the decision branches 152. Further note that, in some embodiments, system 100 may omit pruning module 106. For example, in some such embodiments, the decision branches 152 from branch transformation module 104 may be used as input to the solution selection and validation module 108, which may evaluate the decision branches 152 and determine, based on the set of user-specified criteria, whether any of those decision branches 152 pass the validation process. Non-limiting examples of the validation process performed by solution selection and validation module 108, according to some embodiments, are described in more detail below with reference to FIG. 6.

System 100 further includes updated dataset generation module 112, which, in turn, includes sample removal module 114 and feature removal module 116. In various embodiments, sample removal module 114 is operable to remove one or more of the data samples 122 from the training dataset 120 to generate updated training dataset 140. For example, in various embodiments, if one of the pruned decision branches 154A passes the validation process and is output as a decision rule 130A, the sample removal module 114 removes, from the original training dataset 120, those data samples 122 that are covered by that decision rule 130A. The operation of sample removal module 114 as it removes various data samples 122 from the training dataset 120 during various iterations of the disclosed exhaustive learning techniques are described in detail below with reference to FIG. 3. As one non-limiting example, consider an instance in which the training dataset originally includes ten data samples 122A-122J and, through the process described above, a decision rule 130A is generated that covers data samples 122D and 122J. In this non-limiting example, sample removal module 114 would remove samples 122D and 122J such that updated training dataset 140 only includes data samples 122A-122C and 122E-122I. Note that this simplified example is provided merely for illustration purposes and, in practice, a training dataset 120 may have any suitable number of data samples 122 (e.g., 10,000 samples, 100,000 samples, 1 million samples, etc.).

As indicated in FIG. 1, in various embodiments the updated training dataset 140 may be used by model training module 102 to train additional versions of the machine learning model 150. As noted above, using the updated training dataset 140 (without the data samples 122 that are covered by a previously generated and validated decision rule 130) may provide various technical benefits. For example, consider a machine learning model 150B that is generated during a second iteration of the disclosed exhaustive learning techniques based on the updated training dataset 140. In various embodiments, the machine learning model 150B may include specify various decision branches 152 that include predictive information from these remaining data samples 122 in the updated training dataset 140 that, in the machine learning model 150A trained based on the original training dataset 120, were being masked by the data samples 122 covered by the decision rule 230A. In various embodiments, system 100 may repeat the operations described above for one or more iterations to generate various decision rules 130. For example, during the initial iteration of the disclosed techniques, the first version of the machine learning model 150, model 150A, is generated based on the training dataset 120, according to various embodiments. During subsequent iterations, however, various embodiments include generating the subsequent versions of the machine learning model 150 based on the updated training datasets 140.

In various embodiments, during an iteration (either the initial iteration or a subsequent iteration) of the disclosed exhaustive learning techniques, the solution selection and validation module 108 may determine that none of the pruned decision branches 154 pass the validation operation. As indicated in FIG. 1, in such embodiments the updated dataset generation module 112 may also generate an updated training dataset 140 for use in subsequent iterations. In such instances, however, rather than removing data samples 122, the feature removal module 116 may instead remove one or more features 124 from the training dataset 120 (during iterations other than the initial iteration, the updated training dataset 140) to generate the training dataset 120 (or updated training dataset 140.

The operation of feature removal module 116, according to various embodiments, is described in detail below with reference to FIG. 4. For the purposes of the present discussion, however, consider the following non-limiting embodiment: During a fifth iteration of the disclosed techniques, the solution selection and validation module 108 determines that none of the pruned decision branches 154 from a fifth version of the machine learning model 150 (model 150E that was trained based on updated training dataset 140D from the fourth iteration of the process) pass the validation process. According to various embodiments, the feature removal module 116 may then remove one or more features 124 such that the data samples 122 in the updated training dataset 140E no longer include data values for the removed feature(s) 124. For example, in some embodiments the feature removal module 116 removes one or more of the features 124 having the highest feature importance score(s).

As noted above, removing one or more features 124 from the training dataset may provide various technical benefits. For example, the subsequent version of the machine learning model 150 trained on this updated training dataset 140 (that is, the training dataset for which one or more features 124 have been removed) will have a different (and, in many instances, a significantly different) structure as a result of removing the feature(s) 124, which results in decision branches 152 of significantly different structure that may, ultimately, result in new and interesting decision rules 130 that would not have been discovered using other techniques.

In various embodiments, the disclosed exhaustive learning techniques may be repeated for any suitable number of iterations, as desired. For example, in some embodiments, this process—training a new version of the machine learning model 150, determining whether any of the pruned decision branches 154 pass the validation process to be output as decision rule(s) 130, and generating an updated training dataset 140—may be repeated until a particular number of decision rules 130 are generated, until a particular number of iterations have been performed, until the pruned decision branches 154 fail the validation process a particular number of times in a row, or any other suitable threshold.

Figure 2:
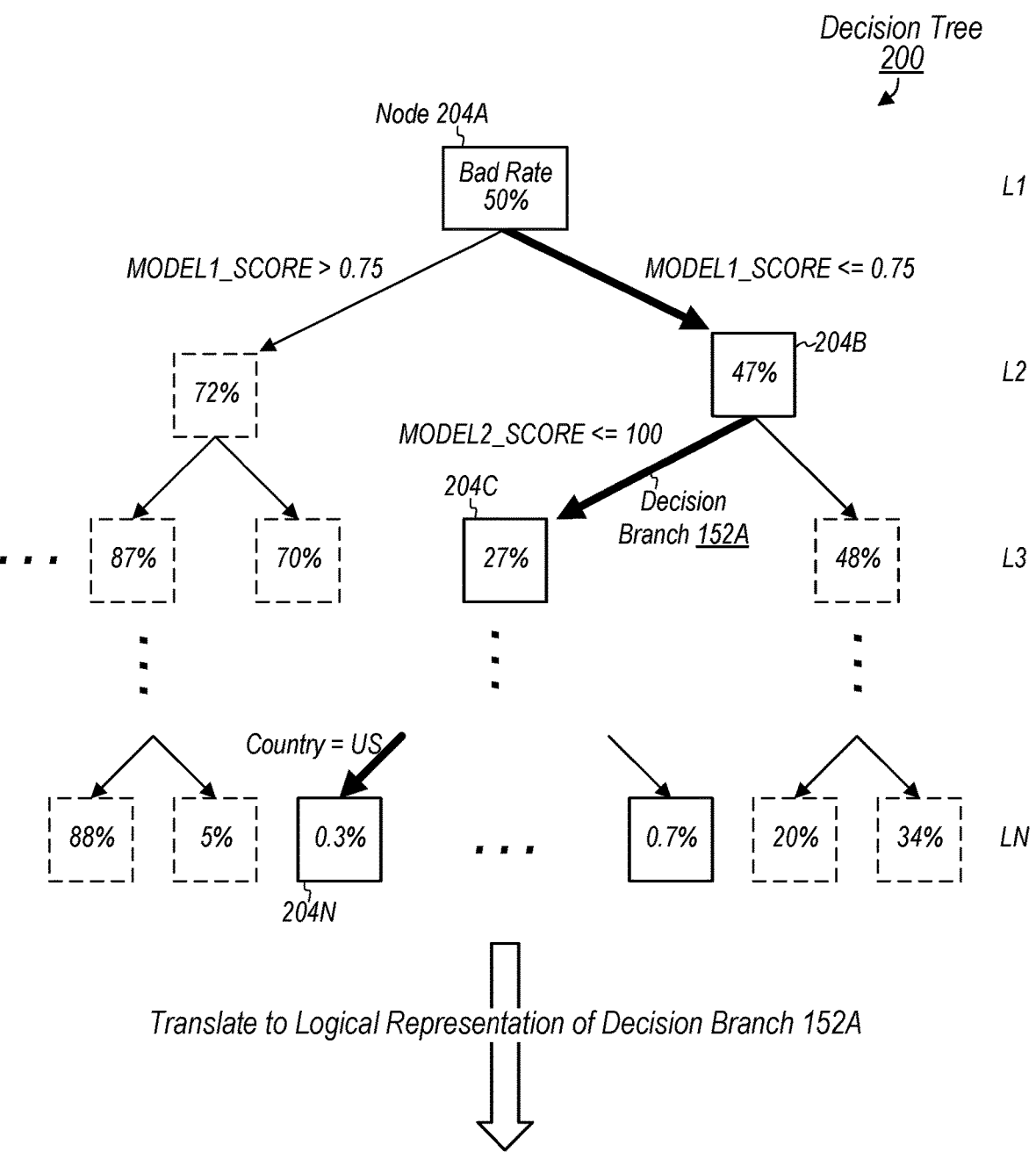
FIG. 2 is a block diagram illustrating a portion of a decision tree, according to some embodiments.

FIG. 2 depicts a portion of a decision tree 200, according to some embodiments. In various embodiments, decision tree 200 is a machine learning model 150 generated, by model training module 102 based on either training dataset 120 or an updated training dataset 140, during an iteration of the disclosed exhaustive learning techniques. For example, in various embodiments the decision tree 200 is generated using a white-box machine learning algorithm, such as CART, ID3, C4.5, etc.

As shown in FIG. 2, decision tree 200 includes a set of nodes 204 arranged into a hierarchy with multiple levels L1-LN. In various embodiments, each of the nodes 204 represents a "test" on a feature 124 of the data samples 122, where the branches stemming from the nodes correspond to the different outcomes for these tests. In this disclosure, the feature 124 being evaluated at a particular node 204 is referred to as an "evaluation criteria," and the value used to determine the outcome of the test is referred to as a "threshold value." In the non-limiting embodiment of FIG. 2, for instance, the highest node 204A (also referred to as the "root" node) in the decision tree 200 provides a test in which the evaluation criteria is the "MODEL1_SCORE" feature 124 and the threshold value for node 204A is 0.75. In decision tree 200, node 204A compares the "MODEL1_SCORE" feature 124 for a data sample 122 to the threshold value of 0.75. If the data sample 122's value for the "MODEL1_SCORE" feature 124 is greater than 0.75, the branch on the left is selected. If, however, the data sample 122's value for the "MODEL1_SCORE" feature 124 is less than or equal to 0.75, the right branch is selected.

In the embodiment depicted in FIG. 2, the nodes 204 are shown with a percentage value indicating the "bad rate" associated with the respective nodes (rather than Gini impurity, entropy, information gain, or other metrics). In this non-limiting example, the "bad rate" is used to indicate, for a given node 204, the percentage of the data samples 122 evaluated at that node 204 that are classified into a particular class (viewed as the less desirable or "bad" class) of two different classes. Note that Gini index, entropy, or information gain measure and determine the best splitting variable and threshold at each node, considering the population distribution of the child nodes. In various embodiments, however, the "bad rate" measures the population distribution/impurity of a decision rule at a node without considering the child nodes. For instance, referring again to the example introduced above in which the training dataset 120 includes spam email data, the data samples 122 have labels 123 that indicate whether the respective data samples 122 are classified as "spam" or "not spam." In a decision tree 200 trained on such a dataset, the "bad rate" for a given node 204 may indicate the number of data samples 122 evaluated at that node that are labeled as "spam." For example, if 1,000 data samples 122 are evaluated by node 204B and 470 of those data samples 122 are labeled as "spam," the "bad rate" for node 204B would be 47%, as indicated in FIG. 2. A node 204's "good rate," by contrast, indicates, for a given node 204, the percentage of the data samples 122 evaluated at that node 204 that are classified into the other class (viewed as the more desirable or "good" class) of the two classes. In the current example, node 204B would have a "good rate" of 53%.

Decision tree 200 specifies various decision branches 152, which are paths through the decision tree from the root node 204A to a terminal node (also referred to as "leaf" nodes). In various embodiments, a decision tree 200 may, potentially, have many (e.g., hundreds, thousands, etc.) of decision branches 152. In FIG. 2, for example, decision branch 152A has been bolded for reference and includes nodes 204A, 204B, 204C, and leaf node 204N (where one or more of the intermediate nodes have been omitted, for clarity). Note that, although each of the decision branches 152 in decision tree 200 are shown as terminating on level LN, this embodiment is provided merely as one non-limiting example and, in other embodiments, a decision branch 152 may end on a different level of the hierarchy than one or more of the other decision branches 152.

Note that, in various embodiments, a decision branch 152 may also be represented as a logical statement that includes the evaluation criteria and threshold values on the decision branch 152's path from the root node 204 to a leaf node 204. As shown in FIG. 2, for example, decision branch 152A may be graphically depicted as a path through decision tree 200 (as indicated in the top portion of FIG. 2) or it may be represented as a logical statement that includes each of the evaluation criteria and the corresponding threshold values for the nodes 204 in the path taken from root node 204A to leaf node 204N. More specifically, in the non-limiting example depicted in FIG. 2, the logical representation of decision branch 152A is "MODEL1_SCORE<=0.75 AND MODEL2_SCORE<=100 AND anomaly_classifier='NO_ANOMALY' AND riskiness_classification≠'RISKY' AND country='US.'" As noted above, in various embodiments the branch transformation module 104 may transform one or more of the decision branches 152 in a machine learning model 150 (e.g., decision tree 200) into a corresponding logical representation of those decision branches 152.

Turning now to FIG. 3, block diagram 300 depicts a representation of training dataset 120 and updated training dataset 140 during various iterations of the disclosed exhaustive learning techniques, according to some embodiments. In FIG. 3, the data samples 122 are represented using a set of circles, where the color of the circles indicates the class into which the corresponding data sample 122 are classified (e.g., solid black circles for Class 1, whit circles for Class 2) and whether the corresponding data sample 122 is covered by a decision rule 130 (e.g., as indicated using a cross-hatch pattern).

For example, at the top of FIG. 3, block diagram 300 depicts ten circles corresponding to ten data samples 122A-122J included in the training dataset 120, where five of the data samples 122 are classified (e.g., using labels 123) as belonging to Class 1 and five of the data samples 122 are classified as belonging to Class 2. As described above, the data samples 122 in the training dataset 120 may be used, by model training module 102, to train a first version of a machine learning model 150, model 150A.

Next, FIG. 3 depicts updated training dataset 140A that includes the remaining data samples 122A-122F, excluding those data samples 122G-122J (indicated using the cross-hatch pattern) that are covered by a decision rule 130A generated based on the training dataset 120. More specifically, in the middle section of FIG. 3, updated training dataset 140A includes six data samples 122A-122I represented using six circles—four black circles (indicating that the corresponding data samples 122 are classified into Class 1) and two white circles (indicating that the corresponding data samples 122 are classified into Class 2). To the right of updated training dataset 140A, FIG. 3 also depicts the four data samples 122G-122J, from the training dataset 120, that were covered by a decision rule 130A generated during an initial iteration of the disclosed exhaustive learning technique. For example, as described above, during an initial round of the exhaustive learning process, system 100 may identify a decision rule 130A that satisfies the various user-specified criteria (e.g., as determined by solution selection and validation module 108). Using that decision rule 130A, the feature removal module 116 may then identify a subset of the data samples 122G-122J, from the training dataset 120, that are covered by the decision rule 130A and exclude these data samples 122G-122J from the updated training dataset 140A. As described above, the updated training dataset 140A may be used to train a new version of the machine learning model 150, model 150B, during the next iteration of the disclosed techniques.

FIG. 3 then depicts updated training dataset 140B that includes the remaining data samples 122A-122C, excluding those data samples 122D-122F (indicated using the cross-hatch pattern) that are covered by a decision rule 130B generated based on the updated training dataset 140A. More specifically, at the bottom of FIG. 3, updated training dataset 140B includes three data samples 122A-122C represented using two black circles and one white circle. To the right of the updated training dataset 140B, FIG. 3 also depicts the three data samples 122D-122F, from the updated training dataset 140A, that were covered by a decision rule 130B generated during the second round of the disclosed exhaustive learning technique. For example, during a second iteration of the exhaustive learning process, system 100 may identify a decision rule 130B that satisfies the various user-specified criteria. Using that decision rule 130B, the feature removal module 116 may then identify a subset of data samples 122D-122F, from the updated training dataset 140A used to generate the decision rule 130B, that are covered by the decision rule 130B and exclude those data samples 122D-122F from the updated training dataset 140B. The updated training dataset 140B may then be used to train a new version of the machine learning model 150, model 150C, during the next iteration of the exhaustive learning process, as desired.

Referring now to FIGS. 4A-4C, block diagrams 400-420 respectively depict training dataset 120, updated training dataset 140C, and updated training dataset 140D, according to one non-limiting embodiment.

In FIG. 4A, block diagram 400 depicts black and white circles representing the data samples 122 in the training dataset 120, as discussed above. Further, the right side of FIG. 4A includes a list of the features 124 in the training dataset 120 ranked based on a measure of feature importance. For example, in various embodiments, training dataset 120 may include any suitable number of features 124 (e.g., 100 features, 1000 features, 5000 features, etc.). As will be appreciated by one of skill in the art, "feature importance" is a technique in which a score is assigned to the various features 124 (e.g., corresponding to the evaluation criteria at the nodes 204) in a decision tree (such as decision tree 200 of FIG. 2) to indicate how important each feature 124 is for the decision that the decision tree makes. That is, in various embodiments, feature importance scores are generated for each input feature to a tree-based model after the model is generated, where a feature importance score indicates the relative importance or predicting power of a corresponding feature for the current model. In one implementation, for example, a feature-importance score may be generated as a floating-point number on a scale from 0.0-1.0, where a feature-importance score of 0.0 indicates that the feature 124 is not used at all by the decision tree to reach a decision and a feature-importance score of 1.0 indicates that the feature 124 perfectly predicts the decision reached using the decision tree. Note that, in some such implementations, the feature-importance scores for a decision tree sum to 1.

In FIG. 4B, block diagram 410 depicts a set of circles representing the data samples 122 remaining in an updated training dataset 140C. Updated training dataset 140C of FIG. 4B corresponds to a version of the updated training dataset 140 after a first feature 124A has been removed, according to some embodiments. For example, as described above with reference to FIG. 1, during an iteration of the exhaustive learning process, if none of the pruned decision branches 154 (or decision branches 152, for example in embodiments of system 100 that exclude pruning module 106) pass the validation operation performed by solution selection and validation module 108, the feature removal module 116 may remove one or more of the features 124 from the set of features 124 in the original training dataset 120. For example, in various embodiments a data sample 122 includes a feature vector that specifies a set of data values (e.g., as a vector) for the various features 124. In embodiments in which the training dataset 120 includes n features 124, for example, the feature vector for a data sample 122 may be a vector of size n where the data values for these various features 124A-124N are stored at corresponding indexes of the feature vector. In the embodiment depicted in FIG. 4B, for example, the feature removal module 116 has removed the feature 124A that, as indicated by the list in FIG. 4A, has the highest feature-importance score of all of the features 124. In some embodiments, removing the feature 124A from the training data may include removing, from the feature vectors for the remaining data samples 122, the data value at the entry corresponding to the index of feature 124A. For example, if feature 124A corresponds to the first entry (e.g., index [0]) of the feature vectors for training dataset 120, feature removal module 116 may delete the first entry in each of the remaining data samples 122 such that the feature vectors for the data samples 122 in the updated training dataset 140C are vectors of size n−1.

In FIG. 4C, block diagram 420 depicts a set of circles representing the data samples 122 remaining in an updated training dataset 140D. Updated training dataset 140D of FIG. 4C corresponds to a version of the updated training dataset 140 after both a first feature 124A and a second feature 124B have been removed from the training data, according to some embodiments. In the embodiment depicted in FIG. 4C, for example, the feature removal module 116 has further removed the feature 124B (after already removing feature 124A). As indicated by the list in FIG. 4B, feature 124B has the highest feature-importance score of all of the remaining features 124B-124N that were still in the updated training dataset 140C. In some embodiments, removing the feature 124B from the training data may include removing, from the feature vectors for the remaining data samples 122 in updated training dataset 140D, the data value at the entry corresponding to the index of feature 124B such that the feature vectors for the data samples 122 in the updated training dataset 140D are vectors of size n−2.

Note that there are fewer circles in the updated training dataset 140C of FIG. 4B than in the training dataset 120 of FIG. 4A, due to the iterative removal of data samples 122 that are covered by decision rules 130, as described above. Further, in FIG. 4C, there are fewer circles in the updated dataset 140D than in updated training dataset 140C of FIG. 4B, again indicating that a subset of the data samples 122 were removed during an intervening iteration of the disclosed techniques.

In various embodiments, the disclosed exhaustive learning techniques may include performing one or more pruning operations to reduce the size or complexity of a machine learning model 150 before that model is used as the basis for one or more decision rules 130. For example, as described above with reference to system 100 of FIG. 1, pruning module 106 may prune one or more nodes from a decision branch 152 to generate a pruned decision branch 154. As will be appreciated by one of skill in the art, pruning a machine learning model 150, such as decision tree 200 of FIG. 2, may provide various technical benefits. For example, without pruning, a decision tree can be prone to overfitting to the training data, resulting in a decision tree (and, by extension, decision rules) that is complex and does not generalize well to new data.

One potential approach to pruning (also referred to as "post-pruning") is a bottom-up approach in which the nodes of a decision tree are recursively analyzed starting with the leaf nodes. Using these techniques, one or more statistical tests (e.g., the chi-squared test) are used to estimate the predictive value provided by a node in the tree and, if that predictive value is below a particular threshold, that node (and the nodes below it in the hierarchy) are removed from the decision tree. Such pruning techniques suffer from various technical shortcomings, however. For example, these pruning techniques utilize objective functions that are defined statistically and cannot be easily interpreted, similar to the black-box machine learning models described above. Additionally, in many instances the objective of training a decision tree model is to obtain decision rules that are tailored to the use case and context in which the decision rules will be utilized. Utilizing these statistically driven pruning techniques, however, relies on objective functions that cannot be adjusted based on user-specified criteria or metrics.

In various embodiments, however, the disclosed pruning techniques address these technical problems by pruning one or more nodes 204 from a decision branch 152 based on a set of one or more user-specified criteria that, in various embodiments, may be adjusted based on real-world needs (e.g., FPR, minimum users or accounts impacted, minimum net-to-gross loss ratio, etc.). For example, FIGS. 5A-5B respectively depict a portion of a decision tree 500 before and after the disclosed pruning operations have been performed, according to some embodiments.

Figure 5A:
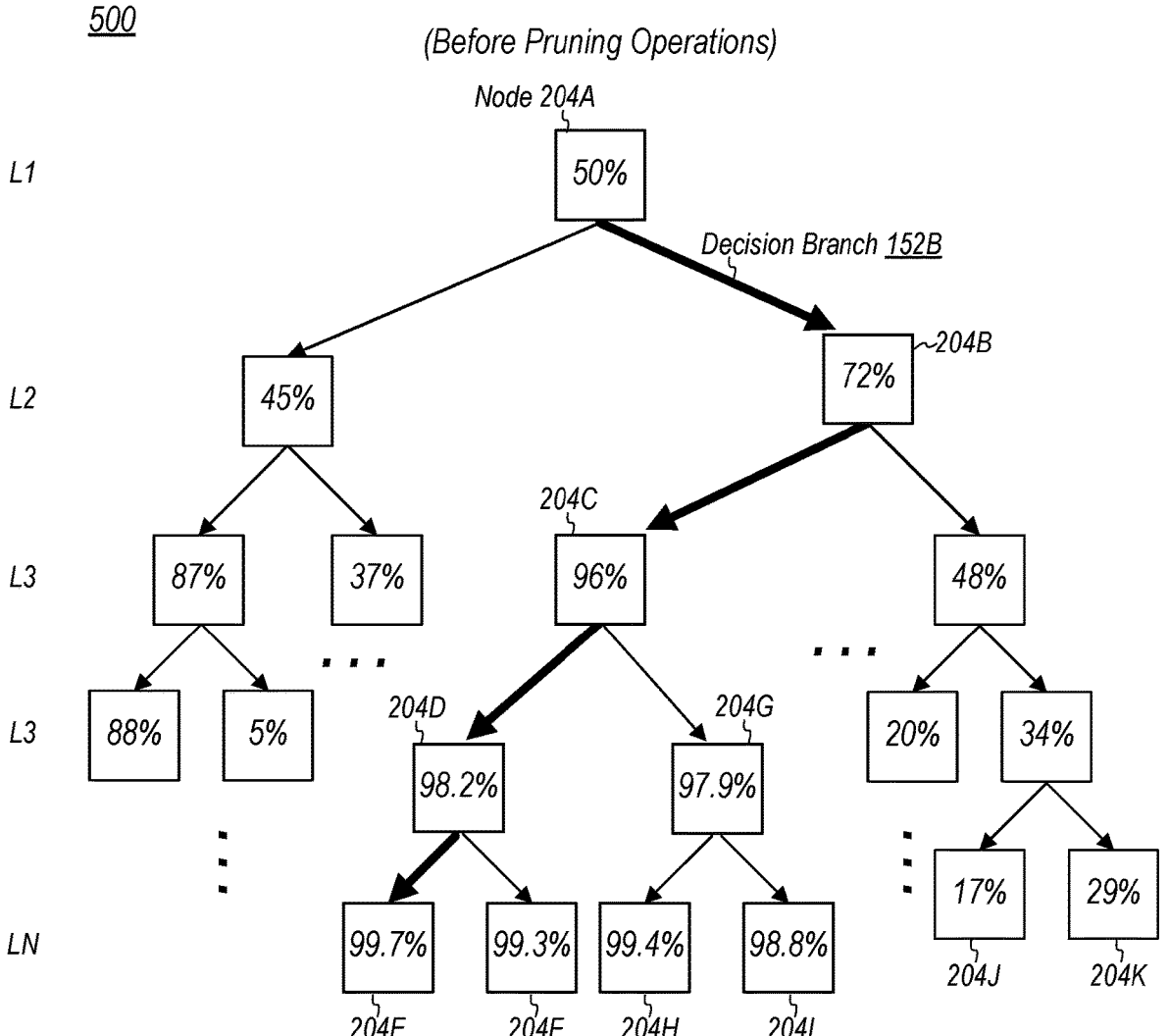
FIGS. 5A-5B are block diagrams that respectively illustrate a portion of a decision tree before and after a pruning operation, according to some embodiments.

In FIG. 5A, decision tree 500 includes a set of nodes 204 arranged into a hierarchy with multiple levels L1-LN. In the depicted embodiment, a particular decision branch 152, decision branch 152B, has been bolded for reference. In this example, the decision branch 152B includes nodes 204A (the root node), 204B, 204C, 204D, and terminal node 204E. Note that, in the embodiment of FIGS. 5A-5B, the nodes 204 show their respective "good rates," as described above. For example, in FIG. 5A, the good rates for the nodes 204A-204E in the decision branch 152B, respectively, are 50%, 72%, 96%, 98.2%, and 99.7%.

In various embodiments, pruning module 106 is operable to prune at least a portion of the decision branch 152B (optionally in addition to one or more other decision branches 152 in the decision tree 500) based on a set of user-specified criteria. For example, in some embodiments the pruning module 106 may perform an initial evaluation of the terminal nodes in the decision tree 500 to identify those decision branches 152 that may be a viable basis for a valid decision rule 130. In some such embodiments, for example, this initial evaluation is performed based on the good rate (or bad rate) of the terminal nodes and includes comparing the good rate to a particular threshold value. As one non-limiting example, in some embodiments the pruning module 106 may remove from further consideration all decision branches 152 in decision tree 500 for which the terminal nodes do not have a good rate that exceeds 95%. In this non-limiting example, the pruning module 106 would keep for further consideration all decision branches 152 in decision tree 500 that terminate in nodes 204E, 204F, 204H, and 204I since the good rates associated with these terminal nodes (99.7%, 99.3%, 99.4%, and 98.8%) all meet the 95% threshold, but the pruning module 106 would remove from further consideration all decision branches 152 that include terminal nodes 204J and 204K since the good rates associated with these terminal nodes (17% and 29%, respectively) do not meet the 95% threshold. Note, however, that this embodiment is provided merely as one non-limiting example. In various embodiments, this initial test may be used to screen those decision branches 152 that, based on the good rate of their terminal nodes, are unlikely to result in a valid decision rule 130, thereby saving time and computational resources. (Note that, in some embodiments, this initial test may be repeated for one or more of the nodes 204 in the remaining decision branches 152 that are higher up in the hierarchy so as to further filter out those decision branches 152 for which one or more of their respective nodes do not satisfy the predetermined good rate (or bad rate) threshold.)

Figure 5B:
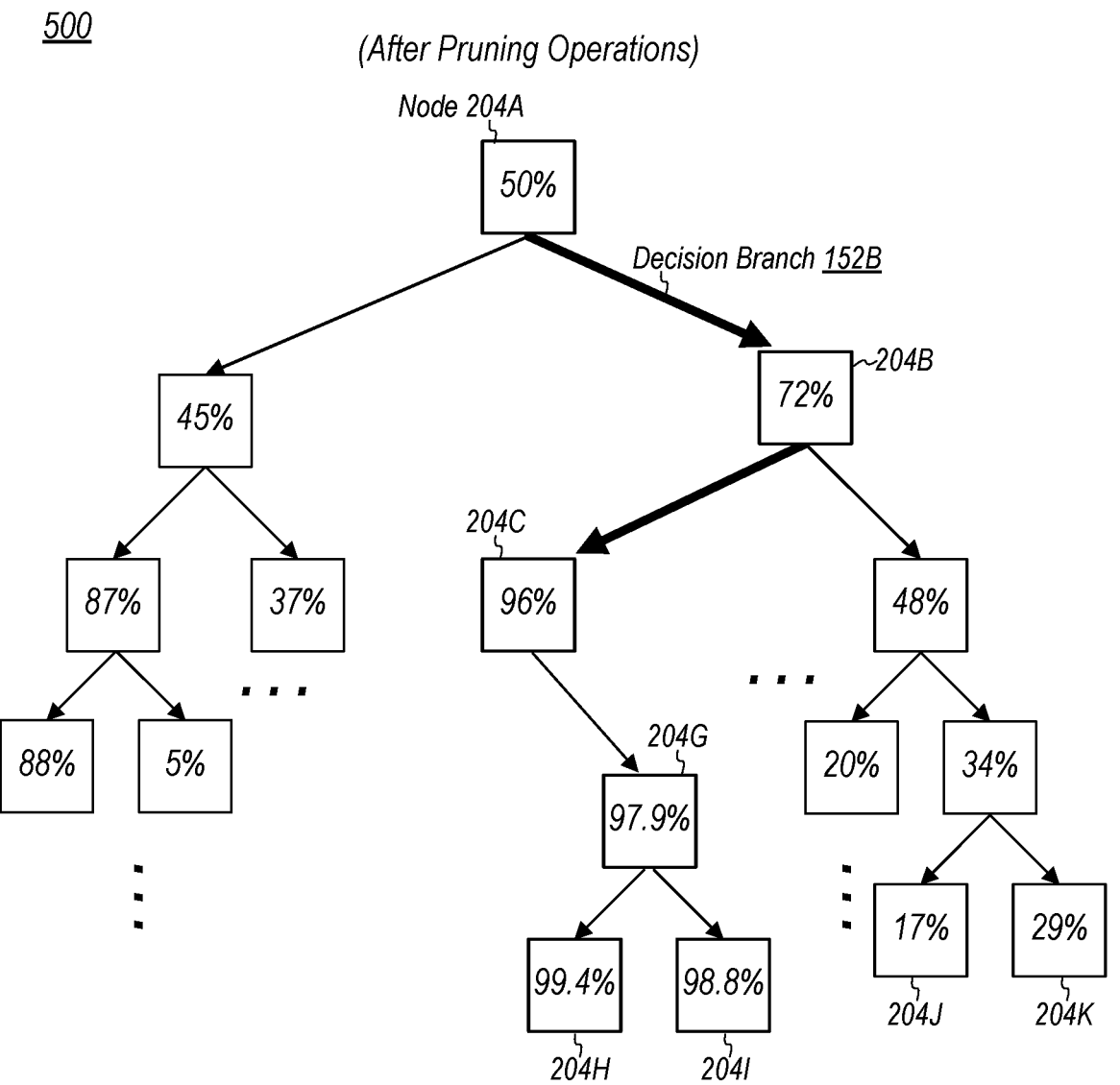

Once a decision branch 152 with a viable terminal node 204 (e.g., terminal node 204E) has been identified, the pruning module 106 may, starting from the terminal node 204, evaluate the various nodes 204 in the decision branch 152 based on a set of one or more user-specified criteria. In some embodiments, this includes recursively evaluating the nodes 204 up a decision branch 152 until the pruning module 106 identifies a node 204 that does not satisfy at least one of the user-specified criteria, then pruning (that is, removing) from the decision branch 152 all of the nodes 204 in the decision branch 152 that are at lower levels in the hierarchy. For example, assume that, in decision tree 500, pruning module 106 first evaluates node 204E and determines that the node 204E satisfies all of the user-specified criteria (as described in greater detail below). After evaluating node 204E, in this example, the pruning module 106 then evaluates the next node 204D that is immediately above node 204E in the hierarchy. Continuing with the example, assume that the pruning module 106 determines that the node 204D also satisfies all of the user-specified criteria and, after evaluating node 204D, the pruning module 106 proceeds to evaluate node 204C. Assume that the pruning module 106 determines that the node 204C does not satisfy at least one of the user-specified criteria. In such an embodiment, the pruning module 106 then removes, from the decision branch 152B, all of the nodes 204 (e.g., 204D and 204E) that are beneath node 204C in the hierarchy, as shown in FIG. 5B. FIG. 5B depicts a version of decision tree 500 after the pruning operations have been used to prune decision branch 152B. In this non-limiting example, the pruned version of decision branch 152B includes only three nodes 204A, 204B, and 204C, pruning module 106 having removed nodes 204D and 204E.

In various embodiments, evaluating a node 204 based on the user-specified criteria includes calculating one or more performance metrics associated with the node 204. For example, in some embodiments, evaluating a node 204 includes using a database query language (e.g., SQL) and a database (e.g., a relational database) to calculate a performance metric based on a logical representation of that node 204 represented using the query language. As one non-limiting example, consider an embodiment in which a user-specified criteria is that the minimum total payment volume ("TPV") enabled per month should be greater than or equal to $200,000. In this non-limiting example, assume that the SQL representation of a node 204 (e.g., node 204E) being evaluated is provided as follows: "model_score1>500 and model_score2>600 and variable1>0.1." Further, in this example, assume that the base dataset in the relational database is named base_table and includes columns corresponding to the TPV, the labels 123, and the months of the year. To calculate the performance metric for this user-specified criteria (monthly TPV enabled) for node 204E, the pruning module 106 may execute the following query in the database: SELECT SUM(TPV) AS monthly_TPV FROM base_table WHERE month="2021-07". In this example, executing this query calculates the monthly TPV value enabled by node 204E and stores that value in the variable monthly_TPV. After the monthly_TPV value is calculated by executing this query, the pruning module 106 would then compare the value of monthly_TPV to the threshold value in the user-specified criteria ($200,000, in the current example). If the node 204E does satisfy this user-specified criteria, the pruning module 106 may evaluate the node 204E based on one or more other user-specified criteria or, if no more user-specified criteria remain, progress up the decision branch 152 to evaluate the next node 204. Note that, in various embodiments, a node 204 may be evaluated based on the user-specified criteria either concurrently (e.g., multiple user-specified criteria evaluated simultaneously) or sequentially (e.g., one user-specified criterion evaluated before moving on to the next).

In various embodiments, removing nodes 204 from a decision branch 152 simplifies the decision branch and, by extension, simplifies the logical representation of that decision branch 152. For example, by removing nodes 204D-204E from the decision branch 152B, the disclosed techniques have removed, from the logical representation of decision branch 152B, the two evaluation criteria and corresponding threshold values used to represent those nodes 204D-204E. This, in turn, may simplify a decision rule 130B that is generated based on the decision branch 152B, thereby reducing the amount of time and computational resources required from the system to utilize that rule 130B.

EXAMPLE METHODS

Figure 6:
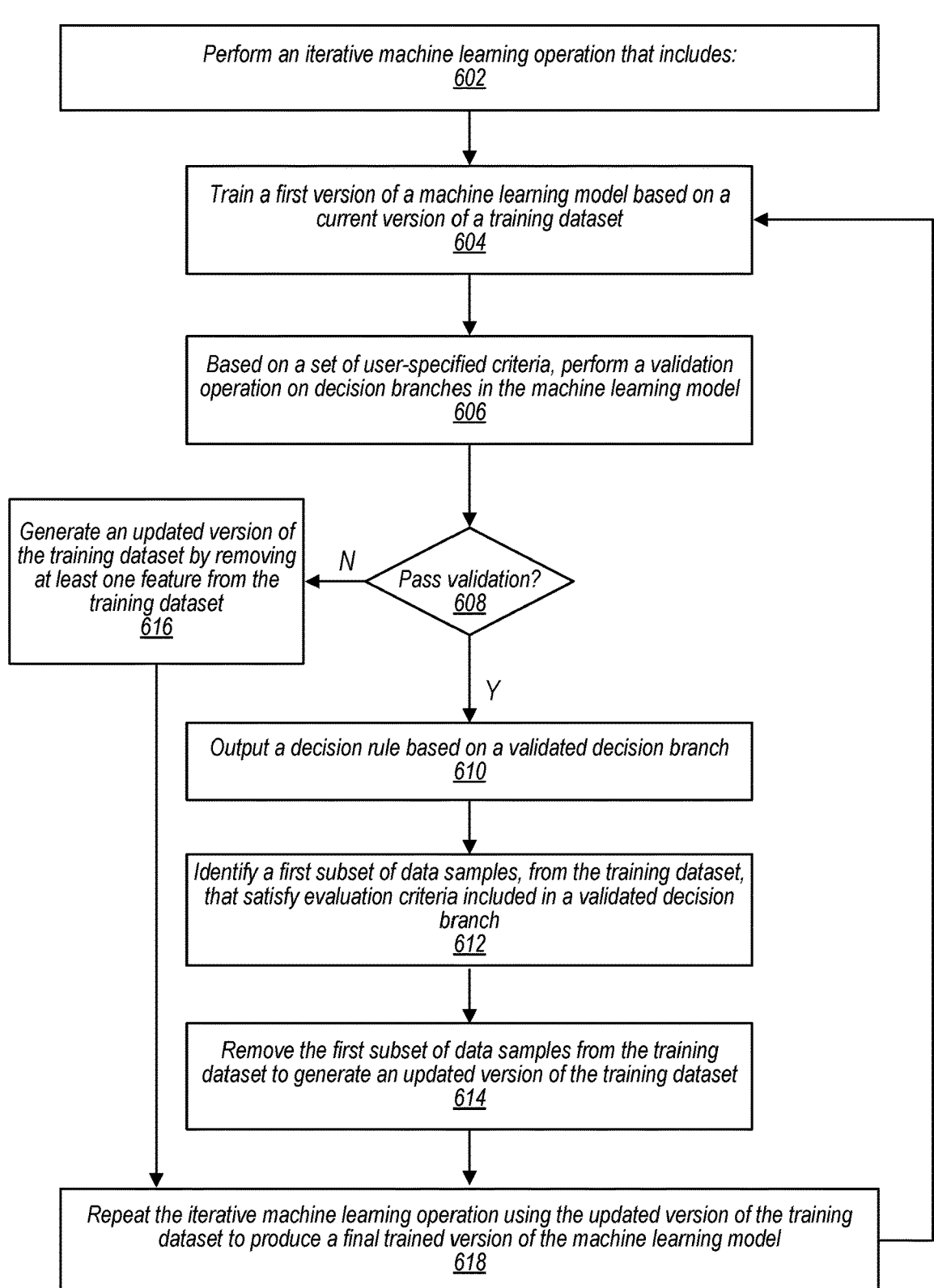
FIG. 6 is a flow diagram illustrating an example method for an exhaustive learning technique for machine learning algorithms, according to some embodiments.

Referring now to FIG. 6, a flow diagram illustrating an example method 600 for an exhaustive learning technique for machine learning algorithms is depicted, according to some embodiments. In various embodiments, method 600 may be performed by system 100 of FIG. 1 to generate one or more decision rules 130, from a given training dataset 120, using an iterative exhaustive learning technique. For example, system 100 may include (or have access to) a non-transitory, computer-readable medium having program instructions stored thereon that are executable by the system 100 to cause the operations described with reference to FIG. 6. In FIG. 6, method 600 includes elements 602-618. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the system performs an iterative machine learning operation. For example, in various embodiments system 100 may perform an iterative machine learning operation based on a training dataset 120 that includes various samples 122, which may include labels 123 and data values for a set of features 124. In the disclosed embodiment, for example, the iterative machine learning operation includes sub-elements 604-616. Note, however, that these sub-elements are listed merely as one non-limiting example and, in other embodiments, element 602 may include additional, fewer, or different sub-elements, as desired.

At 604, in the illustrated embodiment, the system trains a first version of a machine learning model based on a current version of a training dataset. For example, during an initial iteration of method 600, the model training module 102 may train a first version of the machine learning model 150A based on the training dataset 120. In some embodiments, training the first version of the machine learning model 150A is performed using a white-box decision tree learning algorithm (e.g., CART, ID3, C4.5, etc.) such that the resulting machine learning model 150A is a decision tree 200 that includes a plurality of decision branches 152. As noted above, in various embodiments a decision branch includes a plurality of nodes 204 and corresponds to a path from a root node 204A to a particular terminal node 204N in the decision tree 200.

In some embodiments, method 600 may further include performing a pruning operation to prune one or more of the plurality of nodes from a first decision branch 152A based on a set of user-specified criteria. For example, as described in detail above with reference to FIGS. 5A-5B, in some such embodiments the pruning operations may include the pruning module 106, starting from the terminal node in the first decision branch 152A, evaluating a subset of the nodes 204 in the first decision branch 152A based on the set of user-specified criteria, identifying a particular one of the plurality of nodes that does not satisfy at least one of the set of user-specified criteria, and removing, from the first decision branch 152A, the one or more nodes that are at lower levels in the first decision branch than the particular node. Additional non-limiting embodiments of the disclosed pruning operations are described in detail below with reference to FIG. 7.

At 606, in the illustrated embodiment, the system performs, based on a set of user-specified criteria, a validation operation on decision branches in the machine learning model. For example, in various embodiments, solution selection and validation module 108 may evaluate the various decision branches 152 (or, in some embodiments, pruned decision branches 154) based on a set of user-specified criteria, and, at 608 in the illustrated embodiment, determine whether any of the various decision branches 152 or (pruned decision branches 154) pass the validation process. (As noted above, in various embodiments the set of user-specified criteria used during the validation operations may be the same as, overlap with, or entirely separate from one or more user-specified criteria used during a pruning operation to prune the decision branches 152.) In various embodiments, validation operations may be performed in a manner similar to that described above with reference to pruning module 106 evaluating nodes 204 based on user-specified criteria during a pruning operation. For example, in some embodiments, the solution selection and validation module 108 may compare the good rate (or bad rate) of the nodes 204 in a pruned decision branch 154 to a particular threshold value. Further, in some embodiments, the solution selection and validation module 108 may calculate one or more performance metrics (e.g., based on a query language-representation of one or more nodes 204 in the pruned decision branch 154) and compare those performance metrics to threshold values in the user-specified criteria. In various embodiments, the solution selection and validation module 108 may evaluate some or all of the pruned decision branches 154 to identify which (if any) pass the user-specified criteria.

If a decision branch passes the validation operation at sub-element 608, method 600 proceeds to 610, at which the system outputs a decision rule that is based on the validated decision branch. For example, in response to validating the first decision branch 152A based on the set of user-specified criteria, the system 100 may output the first decision branch 152A, generated from the first version of the machine learning model 150A, as a decision rule 130A.

At 612, in the illustrated embodiment, the system identifies a first subset of data samples, from the training dataset, that satisfy evaluation criteria included in the validated decision branch. For example, as described above, sample removal module 114 may use the first decision branch 152A to identify a subset of the data samples 122, from the training dataset 120, which satisfy the threshold values for the various evaluation criteria set out in the first decision branch 152A. At 614, in the illustrated embodiment, the system removes the subset of data samples from the training dataset to generate an updated version of the training dataset. For example, as demonstrated above with reference to FIG. 3, the sample removal module 114 may remove those data samples 122 (e.g., data samples 122G-122J in the embodiment of FIG. 3) that are covered by the first decision branch 152A from the training dataset 120 to generate an updated training dataset 140A.

Method 600 then proceeds to 618, at which, in the illustrated embodiment, the system repeats the iterative machine learning operation using the updated version of the training dataset to produce a final trained version of the machine learning model. For example, in various embodiments, repeating the iterative machine learning operation includes the model training module 102 training a second version of the machine learning model 150B based on the updated version of the training dataset 140A, where the second version of the machine learning model 150B includes a second plurality of decision branches 152, identifying (e.g., by the sample removal module 114) a second subset of the plurality of data samples 122 that are satisfy evaluation criteria included in a second decision branch 152B from the second plurality of decision branches 152, removing the second subset of data samples to generate a second updated version of the training dataset (e.g., updated training dataset 140B), and again repeating the iterative machine learning operation using the second updated version of the training dataset. In various embodiments, the exhaustive learning process depicted in method 600 may be repeated for any suitable number of iterations (e.g., until a desired number of decision rules 130 have been generated, until a particular number of features 124 or data samples 122 have been removed from the training dataset 120, etc.).

Referring again to sub-element 608, if the first decision branch does not pass the validation operation, method 600 proceeds to sub-element 616, at which, in the illustrated embodiment, the system generates an updated version of the training dataset by removing at least one feature from the training dataset. For example, in some embodiments, in response to determining that at least one (or all) of the plurality of decision branches 152 in a machine learning model 150 fail the validation operations, the feature removal module 116 may generate an updated version of the training dataset 140 by removing a first feature 124A, of a plurality of features 124 from the training dataset 120 (or the updated training dataset 140, for iterations of method 600 other than the first iteration) such that the updated version of the training dataset 140 does not include data values for the first feature 124A. In some embodiments, for example, the feature removal module 116 removes the first feature 124A that has a highest feature-importance score of all of the features 124. From 616, method 600 then proceeds to element 618, which, as described above, includes repeating the iterative machine learning operation using the updated version of the training dataset.

Referring now to FIG. 7, a flow diagram illustrating an example method 700 for pruning one or more nodes from a decision branch based on a set of one or more user-specified criteria is depicted, according to some embodiments. In various embodiments, method 700 may be performed by system 100 (e.g., pruning module 106) of FIG. 1 to prune one or more nodes 204 from a decision branch 152 to generate a pruned decision branch 154. For example, system 100 may include (or have access to) a non-transitory, computer-readable medium having program instructions stored thereon that are executable by the system 100 to cause the operations described with reference to FIG. 7. In FIG. 7, method 700 includes elements 702-714. While these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, the system accesses a set of user-specified criterion to prune a decision tree branch. For example, in various embodiments, the pruning module 106 may include (or have access to) a set of user-specified criteria usable to determine which (if any) of the various nodes 204 in a decision branch 152 to prune so as to reduce the size and complexity of a decision rule 130 that will, potentially, be output based on the decision branch 152.

At 704, in the illustrated embodiment, the system accesses a machine learning model that includes a plurality of decision branches. For example, as discussed above with reference to FIG. 2, in various embodiments a machine learning model 150 is a decision tree 200 that includes various (and, potentially, many) decision branches 152. At 706, in the illustrated embodiment, the system, starting with the leaf nodes in the decision branches, applies an initial filter to identify a set of viable decision branches. For example, as described above, in various embodiments the pruning module 106 may evaluate the leaf nodes 204 in the decision branches 152 based on one or more metrics. One non-limiting example of such a metric is the good rate associated with the nodes 204. For example, in some embodiments, element 706 includes identifying, as a viable decision branch 152, those decision branches 152 for which their leaf nodes 204 have a good rate that is at least 99%, though other suitable metrics and threshold values may also be used as an initial filter, as desired. In various embodiments, by initially filtering out decision branches 152 that do not satisfy one or more metrics that require relatively little computational resources (such as good rate and bad rate), the disclosed techniques are able to remove from consideration one or more decision branches 152 that are unlikely to pass the subsequent validation operations, thereby saving time and computational resources that would otherwise be spent evaluating those branches.

At 708, in the illustrated embodiment, the system performs a pruning operation for a first one of the set of viable decision branches identified at element 706. For example, with reference to the non-limiting embodiment depicted in FIG. 5A-5B, the pruning module 106 may perform a pruning operation on decision branch 152B that includes nodes 204A, 204B, 204C, 204D, and 204E. In the embodiment of FIG. 7, method 700 includes sub-elements 710-714. Note, however, that these sub-elements are listed merely as one non-limiting example and, in other embodiments, element 708 may include additional, fewer, or different sub-elements, as desired.

At 710, in the illustrated embodiment, the system, starting from the leaf node, evaluates a subset of the nodes in the first decision branch based on the set of user-specified criteria. For example, starting with leaf node 204E, the pruning module 106 may evaluate at least a subset of the nodes 204 in the decision branch 152A to see if the nodes 204 satisfy the set of user-specified criteria. At 712, in the illustrated embodiment, the system identifies a particular node in the first decision branch that does not satisfy at least one of the set of user-specified criteria and, at 714, in the illustrated embodiment, the system removes, from the first decision branch, one or more nodes that are at lower levels in the first decision branch than the particular node. For example, referring again to the example described above with reference to FIGS. 5A-5B, at 712 the pruning module 106 may determine that node 204C does not satisfy at least one of the user-specified criteria and, at 714, the pruning module 106 may remove nodes 204D and 204E from the decision branch 152B.

As indicated in FIG. 7, in various embodiments, performance of element 708 and sub-elements 710-714 may be repeated one or more times to prune various decision branches 152 in the decision tree 200. For example, in some embodiments the pruning module 106 may perform the disclosed pruning operations to for each of the decision branches 152 in the decision tree 200 that were identified, at 706, as being viable decision branches 152. Note that, although described in the context of the disclosed exhaustive learning techniques, in various embodiments method 700 may be performed in any desired context so as to perform one or more decision branches 152 from a decision tree model based on a set of one or more user-specified criteria.

Example Computer System

Figure 8:
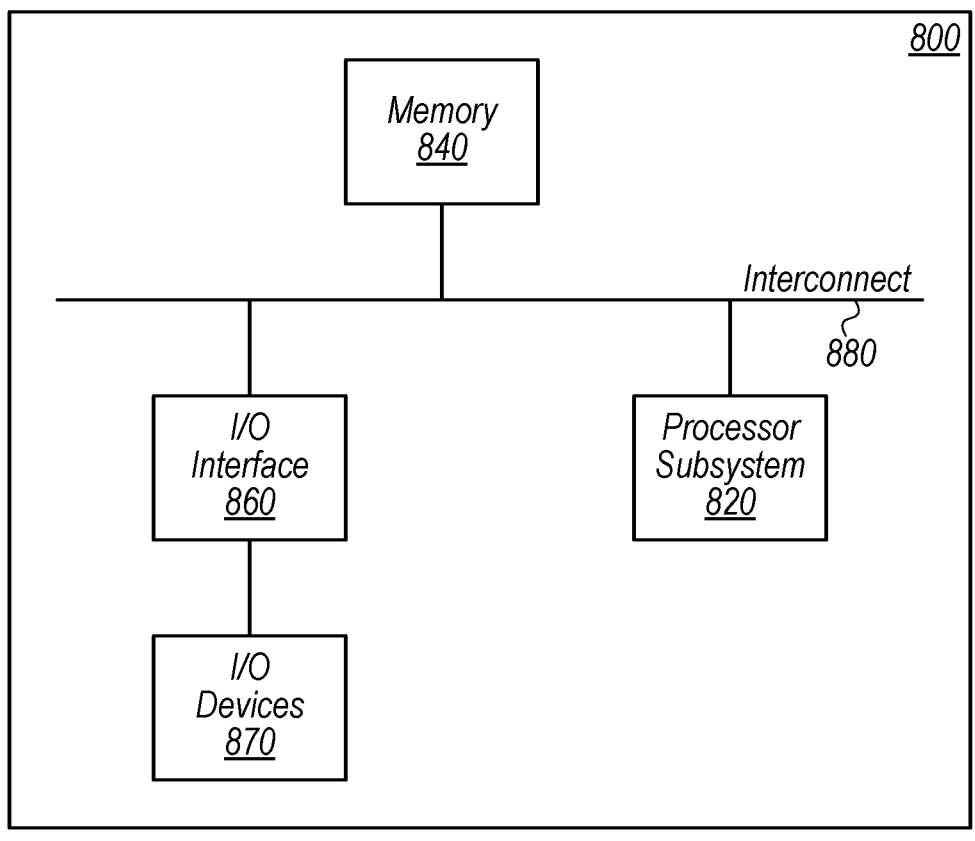
FIG. 8 is a block diagram illustrating an example computer system, according to some embodiments.

Referring now to FIG. 8, a block diagram of an example computer system 800 is depicted, which may implement one or more computer systems, such as system 100 of FIG. 1, according to various embodiments. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause system 800 perform various operations described herein. System memory 840 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage on I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over WiFi, Bluetooth, Ethernet, etc.), and computer system 800 is coupled to a network via the network interface device.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail (e.g., model training module 102, pruning module 106, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:

performing, by a computer system, an iterative machine learning operation that includes:

training a first version of a machine learning model based on a current version of a training dataset that includes a plurality of data samples, wherein the first version of the machine learning model includes a plurality of decision branches;

identifying, within the first version of the machine learning model, a particular node of a particular decision branch of the plurality of decision branches that does not satisfy a set of user-specified criteria, wherein the set of user-specified criteria includes one or both of a maximum false-positive rate (FPR) and a minimum net-to-gross loss ratio;

pruning, based on the identifying, the first version of the machine learning model, including removing one or more nodes in the particular decision branch that are at lower levels of the particular decision branch than the particular node;

determining whether a first subset of the plurality of data samples included in the pruned particular decision branch satisfies one or more criteria in the set of user-specified criteria;

based on the first subset satisfying one or more criteria in the set of user-specified criteria (a) removing the pruned particular decision branch from the plurality of decision branches included in the first version of the machine learning model to generate an updated version of the machine learning model and (b) updating the training dataset by removing the first subset from the plurality of data samples;

outputting the particular decision branch from the first version of the machine learning model as a decision rule; and repeating, by the computer system, the iterative machine learning operation using the updated version of the training dataset and the updated version of the machine learning model to produce a final trained version of the machine learning model.

2. The method of claim 1, wherein the repeating the iterative machine learning operation includes:

training a second version of the machine learning model based on the updated version of the training dataset, wherein the second version of the machine learning model includes a second plurality of decision branches;

identifying a second subset of the plurality of data samples that satisfy second evaluation criteria included in a second decision branch from the second plurality of decision branches; and removing the second subset of data samples from the plurality of data samples to generate a second updated version of the training dataset; and wherein the method further comprises the computer system repeating the iterative machine learning operation using the second updated version of the training dataset.

3. The method of claim 1, wherein the repeating the iterative machine learning operation includes:

determining that at least one of a second plurality of decision branches, from a second version of the machine learning model, fails a validation operation;

in response to the determining, generating, by the computer system, a second updated version of the training dataset, including by removing a first one of a plurality of features from the training dataset such that the second updated version of the training dataset does not include data values for the first feature; and training, by the computer system, a third version of the machine learning model based on the second updated version of the training dataset.

4. The method of claim 3, wherein the first feature has a highest feature-importance score of the plurality of features; and wherein the method further comprises:

selecting, by the computer system, a second decision branch based on the third version of the machine learning model; and in response to validating the second decision branch based on a set of one or more user-specified criteria, outputting, by the computer system, the second decision branch as a decision rule.

5. The method of claim 1, wherein the first version of the machine learning model is a decision tree that includes the plurality of decision branches, wherein the particular decision branch includes a plurality of nodes and corresponds to a first path from a root node to a first terminal node in the decision tree.

6. The method of claim 5, wherein the training the first version of the machine learning model is performed using a decision tree learning algorithm.

7. The method of claim 6, wherein the performing the iterative machine learning operation further includes:

in response to validating the particular decision branch based on the set of user-specified criteria, outputting the particular decision branch, from the first version of the machine learning model, as a decision rule.

8. A non-transitory, computer-readable medium having instructions stored thereon that are executable by a computer system to perform operations comprising:

performing an iterative machine learning operation that includes:

training a first version of a machine learning model based on a current version of a training dataset that includes a plurality of data samples, wherein the first version of the machine learning model includes a plurality of decision branches;

identifying, within the first version of the machine learning model, a particular node of a particular decision branch of the plurality of decision branches that does not satisfy a set of user-specified criteria, wherein the set of user-specified criteria includes one or both of a minimum net-to-gross loss ratio and a minimum number of users impacted;

pruning, based on the identifying, one or more nodes in the particular decision branch that are at lower levels of the particular decision branch than the particular node;

determining whether a first subset of the plurality of data samples included in the pruned particular decision branch satisfies one or more criteria in the set of user-specified criteria;

based on the first subset satisfying one or more criteria in the set of user-specified criteria (a) removing the pruned particular decision branch from the plurality of decision branches included in the first version of the machine learning model to generate an updated version of the machine learning model and (b) updating the training dataset having a second plurality of data samples;

outputting the particular decision branch from the first version of the machine learning model as a decision rule; and repeating the iterative machine learning operation using the updated version of the training dataset and the updated version of the machine learning model to produce a final trained version of the machine learning model.

9. The non-transitory, computer-readable medium of claim 8, wherein the repeating the iterative machine learning operation includes:

training a second version of the machine learning model based on the updated version of the training dataset, wherein the second version of the machine learning model includes a second plurality of decision branches;

identifying a second subset of the plurality of data samples that are covered by a second decision branch from the second plurality of decision branches; and removing the second subset of data samples from the second plurality of data samples to generate a second updated version of the training dataset; and wherein the operations further comprise:

repeating the iterative machine learning operation using the second updated version of the training dataset.

10. The non-transitory, computer-readable medium of claim 8, wherein the repeating the iterative machine learning operation includes:

determining that at least one of a second plurality of decision branches, from a second version of the machine learning model, fails a validation operation;

in response to the determining, generating, by the computer system, a second updated version of the training dataset, including by removing a first one of a plurality of features from the training dataset such that the second updated version of the training dataset does not include data values for the first feature; and training, by the computer system, a third version of the machine learning model based on the second updated version of the training dataset.

11. The non-transitory, computer-readable medium of claim 10, wherein the first feature has a highest feature-importance score of the plurality of features; and wherein the operations further comprise:

selecting a second decision branch based on the third version of the machine learning model; and in response to validating the second decision branch based on a set of one or more user-specified criteria, outputting the second decision branch as a decision rule.

12. The non-transitory, computer-readable medium of claim 8, wherein the first version of the machine learning model is a decision tree that includes the plurality of decision branches, wherein the particular decision branch includes a plurality of nodes and corresponds to a first path from a root node to a first terminal node in the decision tree.

13. The non-transitory, computer-readable medium of claim 12, wherein the pruning includes removing the particular node that does not satisfy the set of user-specified criteria from the particular decision branch.

14. The non-transitory, computer-readable medium of claim 8, wherein the training the first version of the machine learning model is performed using a decision tree learning algorithm, and wherein the performing the iterative machine learning operation further includes:

in response to validating the particular decision branch based on a set of one or more user-specified criteria, outputting the particular decision branch, from the first version of the machine learning model, as a decision rule.

15. A method, comprising:

training, by a computer system, a first version of a machine learning model, using a white box machine learning algorithm, based on a first version of a training dataset that includes a plurality of data samples, wherein the first version of the machine learning model specifies a plurality of decision branches;

selecting a first decision rule that is based on a first decision branch of the plurality of decision branches;

identifying, within the first version the machine learning model, a particular node of the first decision branch that does not satisfy a set of user-specified criteria, wherein the user-specified criteria includes one or both of a false-positive rate (FPR) and a number of users impacted;

pruning, based on the identifying, the first version of the machine learning model, including removing one or more nodes in the first decision branch that are at lower levels of the first decision branch than the particular node;

determining, by the computer system, whether a first subset of the plurality of data samples included in the pruned first decision branch satisfies one or more criteria in the set of user-specified criteria;

based on the first subset satisfying one or more criteria in the set of user-specified criteria (a) removing, by the computer system, the pruned first decision branch from the plurality of decision branches included in the first version of the machine learning model to generate a second version of the machine learning model and (b) updating the training dataset by removing the first subset from the plurality of data samples;

outputting the first decision branch from the first version of the machine learning model as a decision rule; and training, by the computer system, a second machine learning model based on the second version of the machine learning model and the updated training dataset.

16. The method of claim 15, wherein the white box machine learning algorithm is a decision tree learning algorithm, and wherein the method further comprises:

selecting, by the computer system, a second decision rule based on the second machine learning model, wherein the second decision rule is based on a second decision branch that is different than the first decision branch;

identifying, by the computer system, a second subset of the plurality of data samples that satisfy the second decision rule;

removing, by the computer system, the second subset of data samples from the plurality of data samples to generate a third version of the training dataset; and training, by the computer system, a third machine learning model based on the third version of the training dataset.

17. The method of claim 15, further comprising:

determining, by the computer system, that at least one of a second plurality of decision branches, from the second machine learning model, fails a validation operation;

in response to the determining, generating, by the computer system, a third version of the training dataset, including by removing a first one of a plurality of features from the training dataset such that the third version of the training dataset does not include data values for the first feature; and training, by the computer system, a third machine learning model based on the third version of the training dataset.

18. The method of claim 17, wherein the first feature is selected, from the plurality of features, based on a feature-importance score associated with the first feature, wherein the third machine learning model specifies a third plurality of decision branches, and wherein the method further comprises:

selecting, by the computer system, a second decision branch from the third plurality of decision branches specified by the third machine learning model; and in response to validating the second decision branch based on a set of user-specified criteria, outputting, by the computer system, the second decision branch as a decision rule.

19. The method of claim 15, wherein the first version of the machine learning model is a decision tree that includes the plurality of decision branches, and wherein the first decision branch includes a plurality of nodes and corresponds to a first path from a root node to a first terminal node in the decision tree.

20. The method of claim 19, wherein the pruning further includes:

evaluating the first terminal node based on the set of user-specified criteria;

in response to determining that the first terminal node passes the evaluation, evaluating a first parent node of the first terminal node based on the set of user-specified criteria;

in response to determining that the first parent node passes the evaluation, evaluating a second parent node of the first parent node based on the set of user-specified criteria; and in response to determining that the second parent node does not pass the evaluation, removing the first terminal node from the first decision branch.

* * * * *